United States Patent [19]
Keller, III.

[11] 3,789,862
[45] Feb. 5, 1974

[54] DISPOSABLE VALVE CONSTRUCTION AND METHOD OF MAKING SEALS

[75] Inventor: Robert J. Keller, III., Richmond, Va.

[73] Assignee: Kel-Win Manufacturing Company, Inc., Chester, Va.

[22] Filed: Nov. 6, 1972

[21] Appl. No.: 303,712

Related U.S. Application Data
[62] Division of Ser. No. 197,741, Nov. 11, 1971.

[52] U.S. Cl.................. 137/15, 137/454.5, 137/606
[51] Int. Cl.............................................. F16k 1/04
[58] Field of Search .... 137/15, 454.5, 454.2, 454.6, 137/606

[56] References Cited
UNITED STATES PATENTS
2,979,067  4/1961  Kern .................................. 251/362
3,229,710  1/1966  Keller ............................ 137/454.5

FOREIGN PATENTS OR APPLICATIONS
1,015,289  9/1957  Germany ........................ 137/454.5

Primary Examiner—Alan Cohan
Attorney, Agent, or Firm—Warren N. Low; Richard P. Matthews

[57] ABSTRACT

A method of making seals in which the valve member is made from a flexible material, such as plastic. A valve housing member is provided with a longitudinal bore which communicates with a fluid to be dispensed. The housing member is provided with a countersunk portion to receive therein a hollow valve member. The latter is provided with a lower cylindrical portion, the bottom surface of which functions as a valve seat for a centrally disposed stem member. The outer surface of the lower cylindrical portion provides an interference fit for the bore of the housing member. The hollow valve body member is threaded into the countersunk housing until an interference seal is initially established with the bore of the housing member. The valve body member is threaded further causing flexing of the valve body to occur as an integral annular skirt portion of the valve body engages the shoulder at the bottom of the countersunk which serves as a valve seat therefor. Continued threading of the valve body establishes a controlled tension on the valve housing member by an interference in length between the valve member and the housing member between the valve seat and a bottoming out position. While the countersunk portion is threaded to receive the valve body member, the bottom of the countersink is unthreaded and is positioned to support the annular skirt portion of the valve body and prevents radial movement thereof which would cause leaking under heavy pressures.

4 Claims, 6 Drawing Figures

PATENTED FEB 5 1974 3,789,862

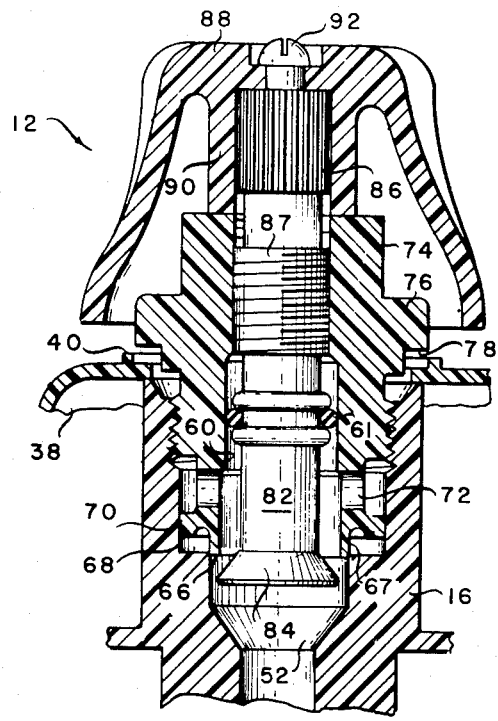
Fig. 4
Fig. 5
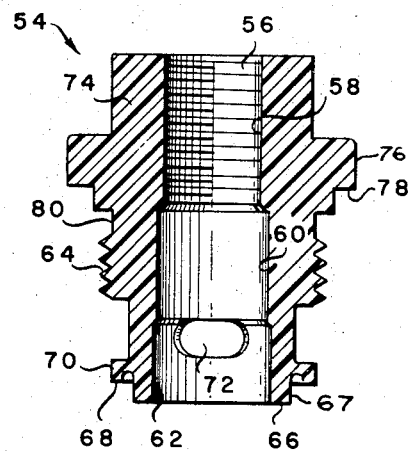

DISPOSABLE VALVE CONSTRUCTION AND METHOD OF MAKING SEALS

This is a division of U.S. Pat. application Ser. No. 197,741, filed Nov. 11, 1971.

This invention relates to a method of making a disposable valve construction almost exclusively from plastic.

The invention is illustrated for use in connection with mixing faucets such as are disclosed in my U.S. Pat. Nos. 3,229,710, issued Jan. 18, 1966; 3,241,810, issued Mar. 22, 1966; and 3,448,768, issued June 10, 1969, although the valve per se and the method of effecting a seal are not limited to this usage.

It is particularly desirable to device a disposable valve wherein substantially all of the wear occurs on the part or assembly which is easily removed. This is accomplished in accordance with the present invention whereby it becomes possible to make a permanent installation of the non-disposable elements of the valve assembly.

It is also desirable to effect a double seal in the vicinity of the valve seat. This is accomplished in accordance with the present invention by providing an interference seal between the bore of the main housing member and an external cylindrical surface at the lower end of a hollow valve body member and a second seal between a flanged annular skirt on the hollow valve body member and a valve seat in the main housing member formed at the bottom of a counter-sink therein. While the seal areas are closely adjacent, they are substantially at right angles to each other.

One difficulty which has heretofore been experienced in mixing faucets is the tendency of the inner O-ring member to be extruded through the lateral ports of the valve member which communicate with a mixing chamber during the assembly of the O-ring member. This tendency for the O-ring to be extruded through these lateral ports frequently cuts the O-ring and results in leaks. The construction of the valve member in accordance with the present invention obviates this tendency to cut or extrude the O-ring during assembly of the valve and ensures that a leak-proof valve is obtained.

Still another feature of the present invention is the use of means to provide support for a flanged annular skirt portion of the hollow valve body member which flexes when it is brought into sealing position. This support is effected in the present invention by so dimensioning the countersunk underbody or main housing member of the valve construction so that it is closely adjacent the flanged annular skirt of the valve body member so as to prevent radial outward movement thereof. In this manner, leaking under heavy pressure is prevented.

The inherent advantages and improvements of the present invention will become more readily apparent upon considering the following detailed description of the invention and by reference to the drawings in which:

FIG. 4 is a fragmentary elevational view taken in vertical cross section along line 4—4 of FIG. 2;

FIG. 5 is an elevational view, taken in vertical cross section, of the valve member of the present invention; and, FIG. 6 is an exploded rear elevational view, shown partially in vertical cross section, further illustrating the arrangement of the parts in accordance with the present invention.

Figure 1:
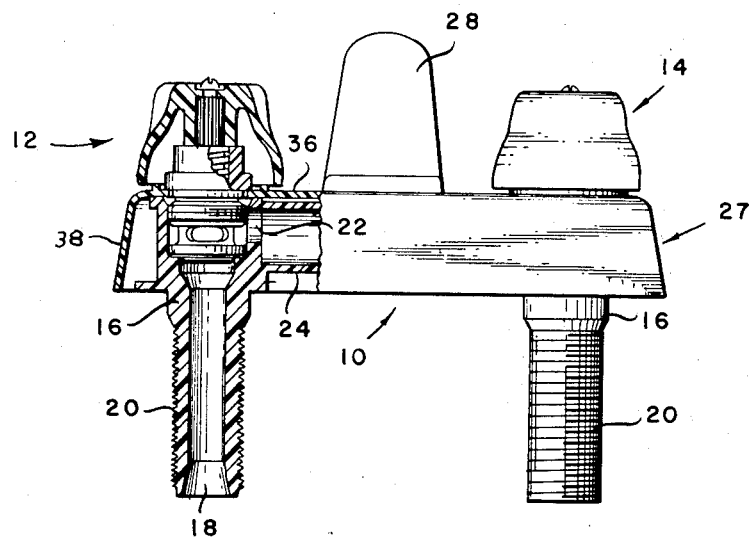
FIG. 1 is a rear elevational view, partially in vertical cross section, illustrating the disposable valve construction of the present invention.

Referring now to FIG. 1 of the drawings, there is illustrated a mixing faucet unit, indicated generally at 10, having one valve assembly 12 on the left side thereof and a duplicate valve assembly indicated generally at 14 on the right side thereof. Since each valve assembly 12 and 14 is identical, only one will be described in detail. An underbody or main housing member 16 is shown to have a central bore 18 extending therethrough and provided with an externally threaded portion 20. The underbody or main housing member 16 is provided with port means 22 consisting of an aperture which communicates with a mixing chamber 24.

Figure 6:
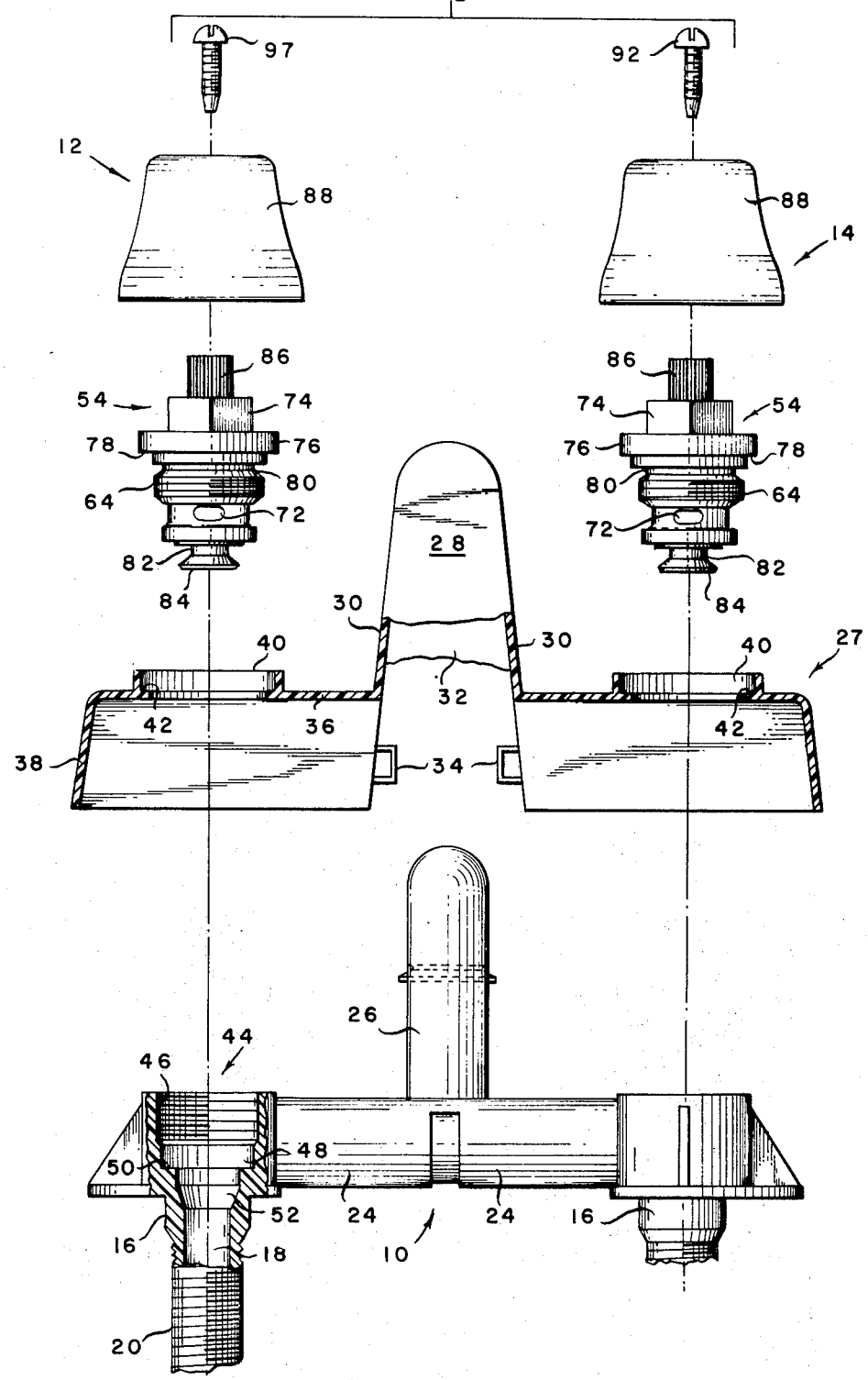

Reference is now made to the remaining figures, and in particular to FIG. 6 for the further details of the main housing member. Thus there is shown a neck portion 26 which is protected within a plastic cover member indicated generally at 27. The plastic cover member 27 is provided with a top wall 28 and side walls 30 which are preferably all made from plastic. A snap-in plastic bottom closure member is shown partially at 32 in FIG. 6 and for purposes of this invention may be substantially identical to that shown in my U.S. Pat. No. 3,448,768. The snap-in bottom closure member 32 is received in suitable snap-in catches 34 and the plastic cover member 27 is further illustrated to have a top wall 36 and an integral depending skirt 38.

In order to receive an individual valve member, the plastic cover member 27 is provided with upstanding flanges 40 which are provided with an internal seat 42. Each underbody member 16 is countersunk as indicated generally at 44 in FIG. 6 and has a threaded upper wall portion 46 and an unthreaded lower wall portion 48 the purpose of which will become more apparent hereinafter. The bottom of countersink 44 comprises a shoulder which constitutes a valve seat 50. A chamber 52 which permits a stem member 82 to open and close is disposed between valve seat 50 and the lower portion of central bore 18.

The valve body member itself is shown in isolation in FIG. 5. Reference to this figure shows that the valve body member designated generally at 54 is hollow by virtue of a central bore 56 which has an internal threaded portion at 58. The hollow valve body member is provided with a central bore region 60 for reception therein of an O-ring 61, shown in assembled position in FIG. 4. The bore is shown to have a relieved portion 62 in order to prevent extrusion of the O-ring 61 through the port means of the valve body member or cutting of the O-ring 61 during the assembly of the valve.

The valve body member is externally threaded at 64. One feature of the invention which permits adjustment of the cooperative forces on the sealing elements of the valve is to make the threaded portion 64 of an opposite hand from the internal threading 58. Thus in one embodiment of the invention the external threads 64 were right-hand threads and the internal threads 58 were left-hand threads.

The hollow valve body member 54 is provided with a lower cylindrical portion, the bottom surface of which at 66 provides an annular valve seat. The lower portion of hollow valve body member 54 has an external surface at 67 which provides a valve sealing surface intended to establish an interference seal with the bore of the main housing or underbody member 16 immediately below valve seat 50. The diameter of external surface 67 is made approximately 0.010 inches greater than the bore of the underbody 16 immediately below valve seat 50 to establish an interference seal. Hollow valve body member 54 is provided with a flanged annular skirt portion 70 integral therewith the lowermost surface of which constitutes a valve sealing surface 68 which is brought into engagement with valve seat 50. The radius illustrated between the flanged annular skirt 70 and the lower cylindrical portion of the hollow valve body member 54 permits flexing of the flanged annular skirt 70. The external surface 67 is permitted to penetrate the bore of underbody 16 below valve seat 50 for approximately 0.075 inches in the fully assembled position of FIG. 3.

The valve body member 54 is shown to have port means 72 and which preferably are in diametrically opposed walls of the valve body member 54. The relieved portion 62 of the central bore of the valve body member 54 is of sufficient length so that O-ring 61 may substantially pass port means 72 before engaging the more restricted bore 60. Therefore, the O-ring 61 will not be extruded through port means 72 nor be cut thereby during the assembly of the disposable valve.

Figure 2:
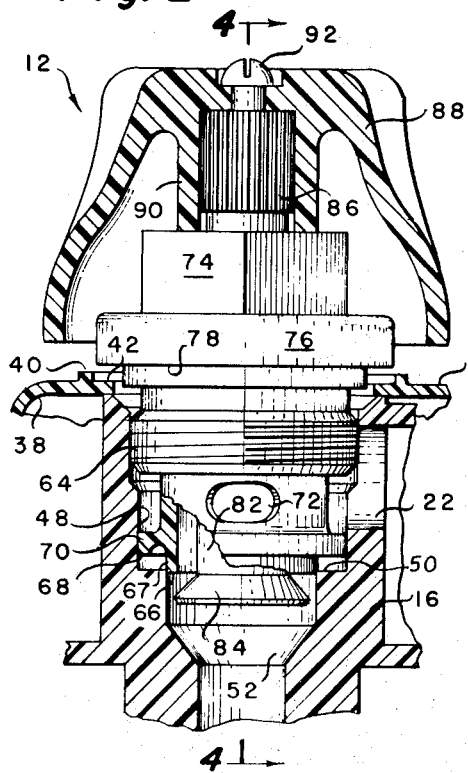
FIG. 2 is a fragmentary elevational view, taken partially in vertical cross section, and drawn to an enlarged scale illustrating one position of the valve assembly of the present invention.
Figure 3:
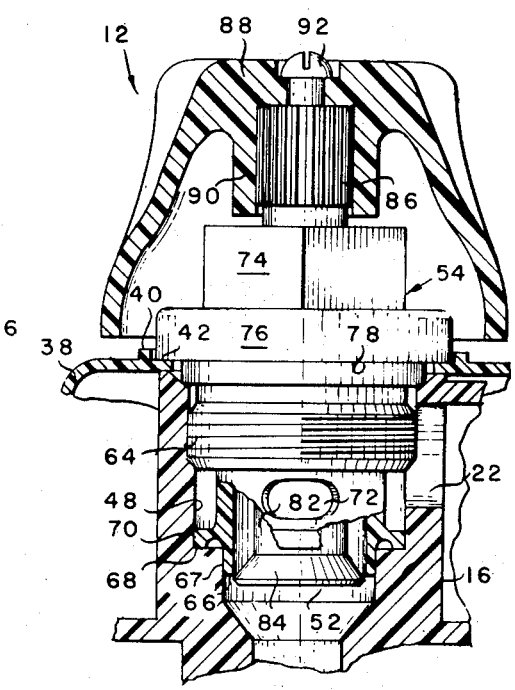
FIG. 3 is a fragmentary elevational view similar to FIG. 2, but showing another position of the valve assembly of the present invention.

The top 74 of valve body member 54 is preferably hexagonal as is illustrated in FIGS. 2, 3 and 6 whereby the valve body 54 may be turned by a socket head wrench or the like and establish a controlled torque in tension on the main housing or underbody 16 by virtue of a length interference between parts between valve seat 50 and bottoming out seat 42. Beneath the hexagonal top 74 is an abutment means 76 having a shoulder 78 formed on the lower surface thereof. This shoulder 78 provides a final stop for valve 54 and because a controlled torque is applied to the valve body 54 this results in a controlled tension being applied to the main housing or underbody 16. The valve body member 54 is further provided with an annular groove 80 in order to receive an O-ring member (not shown).

A stem member is illustrated at 82 in FIGS. 2, 3, 4, and 6 and, as best seen in FIG. 4, is shown to have a valve disk 84 at the lower end thereof and a handle receiving means, such as a spline 86 at the upper end thereof. The valve disk 84 is brought into sealing engagement with the annular valve seat 66 by longitudinal movement of stem member 82.

A handle 88 is frictionally received on spline 86 of the stem member 82 by engagement of its cylindrical hub 90 therewith and is retained thereon with the aid of a screw 92. The stem member 82 is preferably made of brass and with the further exception of screw 92, all other parts hereof are preferably made of plastic. One plastic material which may be used, for example, is Celanese Plastic Company's "CELCON" which is a co-polymer of formaldehyde and is suitable because it has some resiliency. The parts may be made by injection molding.

In the assembly of the valve disclosed herein, the O-ring 61 illustrated in FIG. 4 is placed on stem member 82 and the hollow valve body member 54 is then slipped over the splined end 86 of the stem member and assembled thereto by engagement of the left-handed threads 58 of the valve member with the left-handed threads 87 on stem member 82. A suitable wrench means such as a socket head wrench capable of imparting a controlled torque is used to engage the hexagonal nut like top 74.

The lower cylindrical portion of the hollow valve body 54 enters the bore immediately below the valve seat 50 of countersink 44 and establishes an interference seal therewith by engagement of the valve sealing surface 67. This general position of the valve body member 54 is indicated in FIGS. 2 and 4 although handle 88 will not be in place at that time so that a wrench may engage nut 74. By continuing to thread the hollow valve body member 54 into the countersunk bore the lowermost surface 68 of the flanged annular skirt 70 engages the valve seat 50 at the bottom of countersink 44. In so doing, the hollow valve body member 54 flexes and the radial movement of annular skirt 70 is restrained by the nearness of the unthreaded lower wall portion 48 of countersink 44. In actual practice, only about 0.005 inches clearance is permitted between the outer wall of the flanged annular skirt 70 and the unthreaded lower wall 48. Thus additional radial movement of the flanged annular skirt 70 is prevented which would cause leaking under heavy pressures. The hollow valve body member is continued to be threaded into the counterbore 44 until a final bottoming out position is reached when shoulder 78 abuts against seat 42 of the plastic cover member 27. By making the length of the hollow valve body member 54 between the valve sealing surface 68 and shoulder 78 slightly greater than the distance from the bottom of the counterbore, i.e., shoulder 50, to seat 42 of the plastic cover member 27 a controlled tensioning is established in the main housing or underbody member 16 when shoulder 78 bottoms out on seat 42. This amounts to an interference in length which is partially taken up by the resilience of the threads. In actual practice an interference in length of approximately .012 inches has been used. When handle 88 is applied and retained by screw 92, the fully assembled and closed position of the valve assembly is reached as is shown in FIG. 3.

It will be observed that valve disk 84 of the stem member 82 is in engagement with the valve seat 66 provided by the bottom surface of the lower cylindrical portion of the hollow valve body member 54. It is also important to note that the valve disk 84 of the stem member 82 provides a substantially conical surface whereby the valve disk has a component of force directed toward the bore of the main valve housing member or underbody 16. When the valve body member 54 is new the lower edge of valve seat 66 forms substantially a right angle with the inner bore of the valve body member. The conical surface of the valve disk 84 compensates for wear of this valve seat as the inner edge takes on a beveled configuration.

Since the plastic cover member 27 does not move vertically, engagement of shoulder 78 therewith constitutes engagement with a fixed reference point. The stem member 82 is then movable between the closed position shown in FIG. 3 to its open position by counterclockwise movement of handle 88 assuming right-hand threads at 81 and 46, and left-hand threads for the internal threads on the internal threads 58 on valve member 54 and at 87 on stem member 82. In the closed position of the valve disk 84 as shown in FIG. 3, the bottom of hub 90 is separated from the top 74 of the valve member. Thus it is possible when valve disk 84 is open for water to be received into the bore 18 of the underbody or main housing member 16 from a suitable source, not shown, past the valve disk 84 into the relieved bore portion 62 of valve member 54 and out through port means 72 into mixing chamber 24 and then through neck 26 to be dispensed. While the unthreaded lower wall portion 48 is shown to be substantially larger than the height or length of the flanged annular skirt portion 70 it is only necessary for wall portion 48 to be at least as great as the length of this flange in order to provide close support therefor and prevent radial movement of the flange 70.

The bottom of hub 90 by engagement with the upper surface of hexagonal nut-like top 74 of the valve member 54 as shown in FIG. 2 prevents the O-ring 61 from moving out of the restricted bore portion 60 of the valve body member 54. In other words, hub 90 serves to limit the downward movement of stem member 82.

From the foregoing it will be apparent that a disposable valve assembly is provided wherein a controlled tension load is placed upon the main housing or underbody member. An unpredictable load is exerted in compression of the valve body member, but this member is supported.

While presently preferred embodiments of the invention have been illustrated and described, it will be recognized that the invention may be otherwise variously embodied and practiced within the scope of the claims which follow.

What is claimed is:

1. A method of effecting a valve seal which comprises the steps of
   a. providing a valve housing member from a flexible plastic material with said valve housing member having a bore therein which communicates with a source of liquid,
      1. said bore being provided with a countersunk portion the bottom of which provides a shoulder which constitutes a first valve seat,
      2. said countersunk portion having at least a portion thereof threaded,
      3. providing first abutment-engaging means a predetermined distance above the bottom of said countersunk portion,
   b. inserting a hollow valve body member made from a flexible plastic material into said housing member by threading it into the bore thereof,
      1. said hollow valve body member having a lower cylindrical portion the bottom surface of which provides a valve seat,
      2. said lower cylindrical portion having an external surface which provides a first valve sealing surface,
      3. making said external surface of a sufficiently large diameter to provide an interference fit with said bore of said valve housing member,
      4. said hollow valve body member having a flanged annular skirt portion integral therewith the lowermost surface of which constitutes a second valve sealing surface,
      5. providing an abutment member on said hollow valve body member a predetermined distance above the lowermost surface of said flanged annular skirt portion,
   c. threadedly securing a stem member within said hollow valve body member,
      1. said hollow valve body member having a lower cylindrical portion the bottom surface of which provides a second valve seat,
   d. inserting the lower cylindrical surface of said hollow valve body member into the bore of said housing member and thereby establishing an interference seal,
   e. continuing to insert the lower cylindrical surface of said hollow valve body member into the bore of said valve housing member to effect a second seal between the lowermost surface of said flanged annular skirt portion and said shoulder provided by said countersunk portion,
   f. and flexing said flanged annular skirt portion by continuing the insertion of said lower cylindrical surface of said hollow valve body member into the bore of said housing member until said abutment member on said hollow valve body member is finally stopped by said first abutment engaging means thereby establishing a controlled tensioning of said valve housing member.

2. A method of effecting a valve seal as defined in claim 1 including the additional step of supporting said flanged annular skirt of said hollow valve body member to prevent radial movement thereof.

3. A method of effecting a valve seal as defined in claim 2 wherein said step of supporting said flanged annular skirt of said hollow valve body member to prevent radial movement thereof is accomplished by effecting close dimensional tolerances between the diameter of said countersunk bore and said flanged annular skirt and leaving the bottom of said bore unthreaded for a length at least equal to the length of said flanged annular skirt.

4. A method of effecting a valve seal as defined in claim 1 including the additional step of forming said valve disk on said stem member from a substantially conical surface whereby said valve disk has a component of force toward said bore of said valve housing member when said disk is brought into engagement with said second valve seat thereby compensating for wear of said second valve seat.

* * * * *